March 26, 1929.　　W. H. DURANT　　1,706,917

GREASE CUP

Filed Nov. 8, 1926

Inventor.
William H. Durant
by Heard Smith & Tennant.
Attys.

Patented Mar. 26, 1929.

UNITED STATES PATENT OFFICE.

WILLIAM H. DURANT, OF READING, MASSACHUSETTS.

GREASE CUP.

Application filed November 3, 1926. Serial No. 146,869.

This invention relates to grease cups and particularly to a cap or closure therefor.

One of the objects of the invention is to provide a grease cup cap with novel means for locking the cap to the grease cup so that it will not work loose due to vibration of the machine or part with which the grease cup is used.

Another object of the invention is to provide the grease cup cap with novel indicating means which will visually indicate the amount of grease in the grease cup.

In order to give an understanding of the invention I have illustrated in the drawings a selected embodiment thereof which will now be described after which the novel features will be pointed out in the appended claims.

Figure 1:
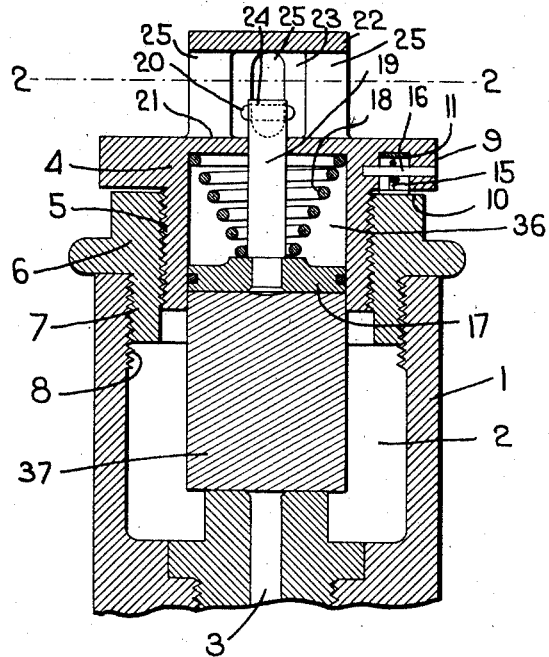
Fig. 1 is a sectional view of a grease cup embodying my invention having my improved cap applied thereto, said section being taken on the line 1—1, Fig. 2.
Figure 2:
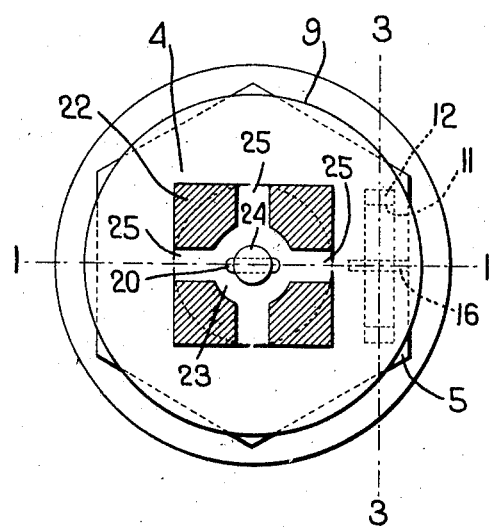
Fig. 2 is a section on the line 2—2, Fig. 1.
Figure 3:
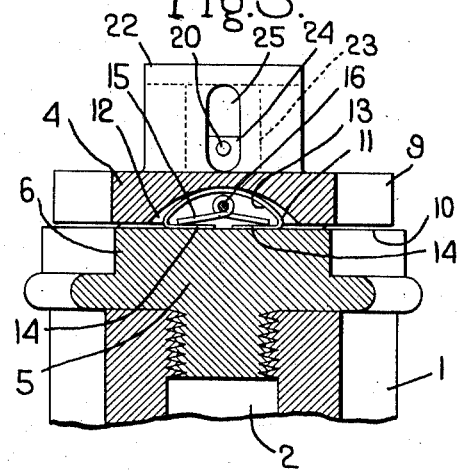
Fig. 3 is a section on the line 3—3, Fig. 2.

In the drawing 1 indicates the grease cup which is provided with a grease-receiving chamber 2. This grease cup may be attached to or used in connection with any machine or apparatus which requires grease. The grease cup is provided with a duct 3 through which the grease is delivered from the grease-receiving chamber 2 to the bearing which is to be lubricated.

4 indicates the grease cup closure which is in the form of a cap. This is made with the screw-threaded portion 5 which is illustrated as screwing into a bushing 6, the latter in turn having a screw-threaded portion 7 that has screw-threaded engagement with the internal screw threads 8 of the grease cup 1.

One feature of my invention relates to a novel means for locking the cap 4 to the bushing 6, which means will prevent the cap from becoming loosened due to jar or vibration of the machine with which the device is used. The cap 4 has a flange 9 which overlies the end of the bushing 6, and this flange carries a resilient locking member which frictionally engages the end wall 10 of the bushing 6 and thereby prevents the cap from unscrewing due to jar or vibration. This resilient locking member is indicated at 11 and is received in a recess 12 formed in the under side of the flange 9. This locking member 11 may conveniently be made from a strip of spring metal and in the form shown the strip is bent to present a curved body portion 13, with the ends of the strip bent toward each other to form the feet 14. These feet rest on and frictionally engage the top surface 10 of the bushing 6.

Means are provided for retaining the locking member 11 in the recess 12 and for maintaining it properly positioned in the recess. This is herein accomplished by a retaining member 15 in the form of a wire which is looped about a pin 16 that is carried by the flange 9 and extends transversely across the recess 12. The ends of the wire 15 rest against the feet 14. The locking member is prevented from falling out of the recess when the cap is removed by the pin 16 and the engagement of the ends of the wire retainer 15 with the feet 14 serve to hold the locking member 11 in its proper position.

The locking member is so formed that normally when it is not subjected to pressure, as will be the case when the cap is removed from the grease cup, the feet 14 will assume a position below the lower surface of the flange 9. When the cap 4 is screwed into the bushing the feet 14 will engage the surface 10 before the cap is tightened and during the final screwing up of the cap the locking member will be flexed and the feet will be pressed yieldingly against the surface 10 with considerable pressure. This yielding frictional engagement of the feet 14 with the surface 10 will be sufficient to lock the cap from backward turning movement and to hold the cap from becoming loosened due to jar or vibration in the machine with which the grease cup is used.

Another feature of my invention relates to a telltale device to indicate the quantity of grease in the chamber 2. As herein shown the cap 4 is provided with a chamber 36 in which is received a spring-pressed plunger 17, the latter being acted upon by a spring 18 which normally tends to force it downwardly against the grease in the chamber 2. This grease is frequently a hard grease in the form of a stick such as shown at 37 and when this type of grease is used the stick or cake of grease will have a cross-sectional area similar to that of the chamber 36. The pressure of the plunger 17 against the cake or stick of grease holds it against the end of the duct 3 and the heat generated in the bearing of the machine is relied upon for melting the grease gradually, the melted grease running down the duct 3 to the bearing. The plunger 17 acts as a follower to hold the grease against the end of the duct 3 as the grease gradually melts.

In order to give an indication as to the amount of grease in the chamber 2 the plunger has rigid therewith a telltale stem 19 which extends through the body of the cap and is provided in its projecting end with a stop pin 20 that serves to limit the spring-impelled movement of the plunger 17. The amount which the end of the pin projects beyond the face 21 of the cap will give an indication of the amount of grease in the chamber 2.

In order to protect the telltale device from being bent or broken or otherwise injured the cap is formed with an extension 22 which is provided with a chamber 23 in which the end 24 of the telltale is received and the extension is formed with sight openings 25 leading to the chamber and through which the end 24 of the telltale stem can be observed. This housing or extension 22 protects the telltale from being injured by being struck against any object but at the same time does not interfere with the observation of the telltale.

The extension 22 may conveniently be made square or flat-sided so that it forms a wrench-receiving portion to which a wrench may be applied for screwing the cap or closure into or out from the grease cup.

The invention would also operate if the grease used were a soft grease as the pressure of the spring-pressed plunger 17 would tend to feed the grease through the duct and the telltale device would indicate the amount of grease in the chamber.

While I have illustrated herein one form of resilient locking device yet I do not wish to be limited to the particular construction illustrated as the shape of the locking device may be varied more or less without departing from the invention.

I claim:

1. In a device of the class described, the combination with a grease cup having a grease-receiving chamber and a screw-threaded opening, of a cap screw threaded into said opening and provided with a flange overlying the end of the grease cup, said flange having a recess therein, and a resilient locking member located entirely in said recess, said locking member having a curved body, and feet which have a yielding frictional engagement with the end of the grease cup due to the resiliency of said body.

2. In a device of the class described, the combination with a grease cup having a grease-retaining chamber and a screw-threaded opening, a cap screw threaded into said opening and provided with a flange overlying the end of the grease cup, said flange having a recess therein, and a resilient locking member located entirely in said recess, said locking member having an arcuate-shaped body with a foot portion extending from each end of the body toward the other end, said feet portions resting against the end face of the grease cup and by frictional engagement therewith preventing accidental turning movement of the cap.

3. In a device of the class described, the combination with a grease cup having a grease-retaining chamber and a screw-threaded opening, a cap screw threaded into said opening and provided with a flange overlying the end of the grease cup, said flange having a recess therein and a resilient locking member located entirely in said recess, said locking member having an arcuate-shaped body with a foot portion extending from each end of the body toward the other end, said feet portions resting against the end face of the grease cup and by frictional engagement therewith preventing accidental turning movement of the cap, and means for retaining the arcuate-shaped resilient member in said recess.

4. In a device of the class described, the combination with a grease cup having a grease-retaining chamber and a screw-threaded opening, a cap screw threaded into said opening and provided with a flange overlying the end of the grease cup, said flange having a recess therein and a resilient locking member located entirely in said recess, said locking member having an arcuate-shaped body with a foot portion extending from each end of the body toward the other end, said feet portions resting against the end face of the grease cup and by frictional engagement therewith preventing accidental turning movement of the cap, and a retaining member anchored in the recess and having arms resting against the feet of the locking member.

5. The combination with a grease cup having a grease-receiving chamber, of a cap detachably applied thereto, said cap having a cylindrical chamber and a hollow extension separate from said chamber by a partition, said chamber having its end closed and being provided with a plurality of lateral slots, a follower in the chamber of the cap, a stem secured to the follower and extending through the partition and into the chamber of the extension, and a stop pin carried by the stem and located entirely within the chamber of the extension, said stop pin by its engagement with the partition limiting the spring-impelled movement of the follower, and said extension being squared externally, whereby it forms a wrench-receiving portion for the cap.

In testimony whereof, I have signed my name to this specification.

WILLIAM H. DURANT.